US011797336B1

(12) United States Patent
Kinsburskiy et al.

(10) Patent No.: US 11,797,336 B1
(45) Date of Patent: *Oct. 24, 2023

(54) SYSTEM AND METHOD FOR SWITCHING FILE SYSTEMS BASED ON AN INSTRUCTION FROM A USER APPLICATION

(71) Applicant: Virtuozzo International GmbH, Schaffhausen (CH)

(72) Inventors: Stanislav Kinsburskiy, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 369 days.

This patent is subject to a terminal disclaimer.

(21) Appl. No.: 17/147,128

(22) Filed: Jan. 12, 2021

Related U.S. Application Data

(63) Continuation of application No. 15/851,923, filed on Dec. 22, 2017, now Pat. No. 10,891,153.

(60) Provisional application No. 62/462,053, filed on Feb. 22, 2017.

(51) Int. Cl.
  *G06F 16/13* (2019.01)
  *G06F 9/48* (2006.01)
  *G06F 16/11* (2019.01)
  *G06F 16/178* (2019.01)

(52) U.S. Cl.
  CPC ............ *G06F 9/485* (2013.01); *G06F 16/116* (2019.01); *G06F 16/13* (2019.01); *G06F 16/178* (2019.01)

(58) Field of Classification Search
  CPC ...... G06F 9/485; G06F 16/178; G06F 16/116; G06F 6/13
  See application file for complete search history.

(56) References Cited

U.S. PATENT DOCUMENTS 10,891,153 B1 * 1/2021 Kinsburskiy ......... G06F 16/116

* cited by examiner

*Primary Examiner* — Truong V Vo
(74) *Attorney, Agent, or Firm* — ArentFox Schiff LLP; Michael Fainberg

(57) ABSTRACT

A system and method is provided for switching file systems based on an instruction from a user application. An exemplary method includes receiving an instruction from a user application to replace a first file system by a second file system, identifying and temporarily suspending all processes that are working with one or more files on the first file system, obtaining information about all files that are used by a temporarily suspended process, the obtained information including at least information on corresponding memory mappings or file descriptors, replacing resources of the first file system by matching resources of the second file system, synchronizing attributes of the first and second file systems, and resuming execution of suspended processes.

20 Claims, 8 Drawing Sheets

SYSTEM AND METHOD FOR SWITCHING FILE SYSTEMS BASED ON AN INSTRUCTION FROM A USER APPLICATION

CROSS REFERENCE TO RELATED APPLICATIONS

This application is a continuation of U.S. patent application Ser. No. 15/851,923, filed on Dec. 22, 2017, which claims benefit of priority to U.S. Provisional Patent Application No. 62/462,053, filed Feb. 22, 2017, the contents of which are hereby incorporated by reference.

TECHNICAL FIELD

The current disclosure generally relates to resource deallocation, and, more particularly, to a system and method for switching file systems underneath working processes.

BACKGROUND

During typical computing operations, a computer processing unit ("CPU") will execute many processes, which, in turn, access one or more system resources, such as computer files and data written thereto, using memory mappings, file descriptors, and the like.

For example, FIG. 1 illustrates a high-level diagram for execution and working with files of a conventional computer process. As shown, a process or task 10 that is executed by a computer processing unit of a computing device can access (e.g., read and write to, open, map, etc.) one or more files on a file system 20. As shown, the file system 20 has a file system tree containing a root file directory 21, one or more file directories 22A and 22B (annotated as file directories 1 and 2) and files, such as files 23A and 23B. During operation, the task 10 may access one or more files (e.g. 23A and 23B, as shown in FIG. 1) and directories. For example, the task 10 may map files (e.g., file 23A) to its address space and/or open files (e.g., file 23B) using a file descriptor table ("FDT") 12 of the process.

Currently, there are many instances where an existing file system needs to be replaced with another file system. For example, switching of file systems may be required to perform hardware maintenance or to switch computing resources from a local file system to remote file system (e.g., a cloud storage service) and the like. However, file system switching may result in operational errors if the switching is performed when a task is being executed and attempts to access a file from an existing file system. Accordingly, a system and method is desired that facilitates seamless file system switching during process execution.

SUMMARY

According to the exemplary aspect, a system and method is provided for switching file systems based on an instruction from a user application. The method comprises receiving an instruction from a user application to replace a first file system by a second file system, identifying and temporarily suspending all processes that are working with one or more files on the first file system, obtaining information about all files that are used by a temporarily suspended process, the obtained information including at least information on corresponding memory mappings or file descriptors, replacing resources of the first file system by matching resources of the second file system, synchronizing attributes of the first and second file systems, and resuming execution of suspended processes.

In one aspect, the replacing of the resources of the first file system by matching resources of the second file system comprises: obtaining or generating a device ID of the second file system and any number of mount IDs of the second file system, replacing mount points of the first file system with respective mount IDs of the second file system, opening files of the second file system that correspond to respective files of the first file system, wherein the correspondence is based on the files having matching paths, names and types of files, replacing file descriptors for opened files of the first file system by file descriptors of corresponding files of the second file system, and replacing memory mapping of the first file system by memory mapping of the second file system.

In one aspect, the synchronization comprises: synchronizing the file descriptor attributes of the first and second file systems.

In one aspect, the first file system and the second file system are created by the user application.

In one aspect, the identification of all of the processes that are working with the one or more files of the first file system comprises: obtaining information about all running processes from an operating system, and identifying, from among all of the running processes, which of the processes are working with files on the first file system during the execution of the process.

In one aspect, the device IDs and mount IDs are determined from the file descriptor of the respective file system.

In one aspect, the synchronized attributes include file offset, flags and locks.

In one aspect, the method further comprises: notifying the user application that the switching of the file systems is completed.

In one aspect, a system is disclosed for switching file systems based on an instruction from a user application. The system includes a first file system and a second file system each configured to store a plurality of electronic files; and at least on processor configured to: receive an instruction from a user application to replace a first file system by a second file system, identify and temporarily suspend all processes that are working with one or more files on the first file system, obtain information about all files that are used by a temporarily suspended process, the obtained information including at least information on corresponding memory mappings or file descriptors, replace resources of the first file system by matching resources of the second file system, synchronize attributes of the first and second file systems, and resume execution of suspended processes.

In one aspect, a non-transitory computer readable medium is disclosed the computer readable medium storing thereon computer executable instructions for switching file systems based on an instruction from a user application, including instructions for: receiving an instruction from a user application to replace a first file system by a second file system, identifying and temporarily suspending all processes that are working with one or more files on the first file system, obtaining information about all files that are used by a temporarily suspended process, the obtained information including at least information on corresponding memory mappings or file descriptors, replacing resources of the first file system by matching resources of the second file system, synchronizing attributes of the first and second file systems, and resuming execution of suspended processes.

The above summary of example aspects serves to provide an understanding of the invention. This summary is not an extensive overview of all contemplated aspects, and is intended to neither identify key or critical elements of all aspects nor delineate the scope of any or all aspects of the invention. Its sole purpose is to present one or more aspects in a concise form as a prelude to the more detailed description of the invention that follows. To the accomplishment of the foregoing, the one or more aspects of the invention include the features described and particularly pointed out in the claims.

BRIEF DESCRIPTION OF DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
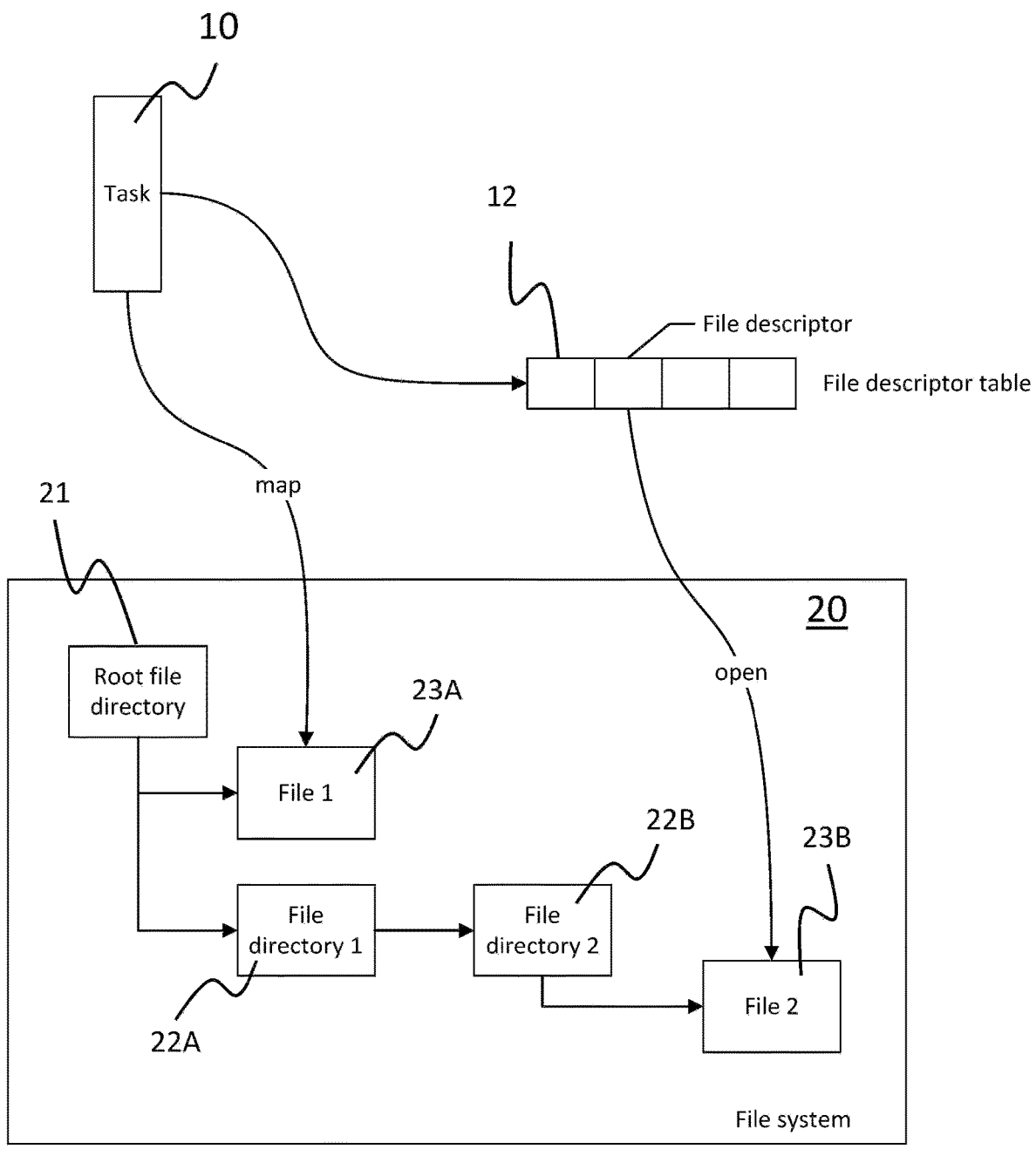
FIG. 1 illustrates a high-level diagram for execution and working with files of a conventional computer process.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

Figure 2A:
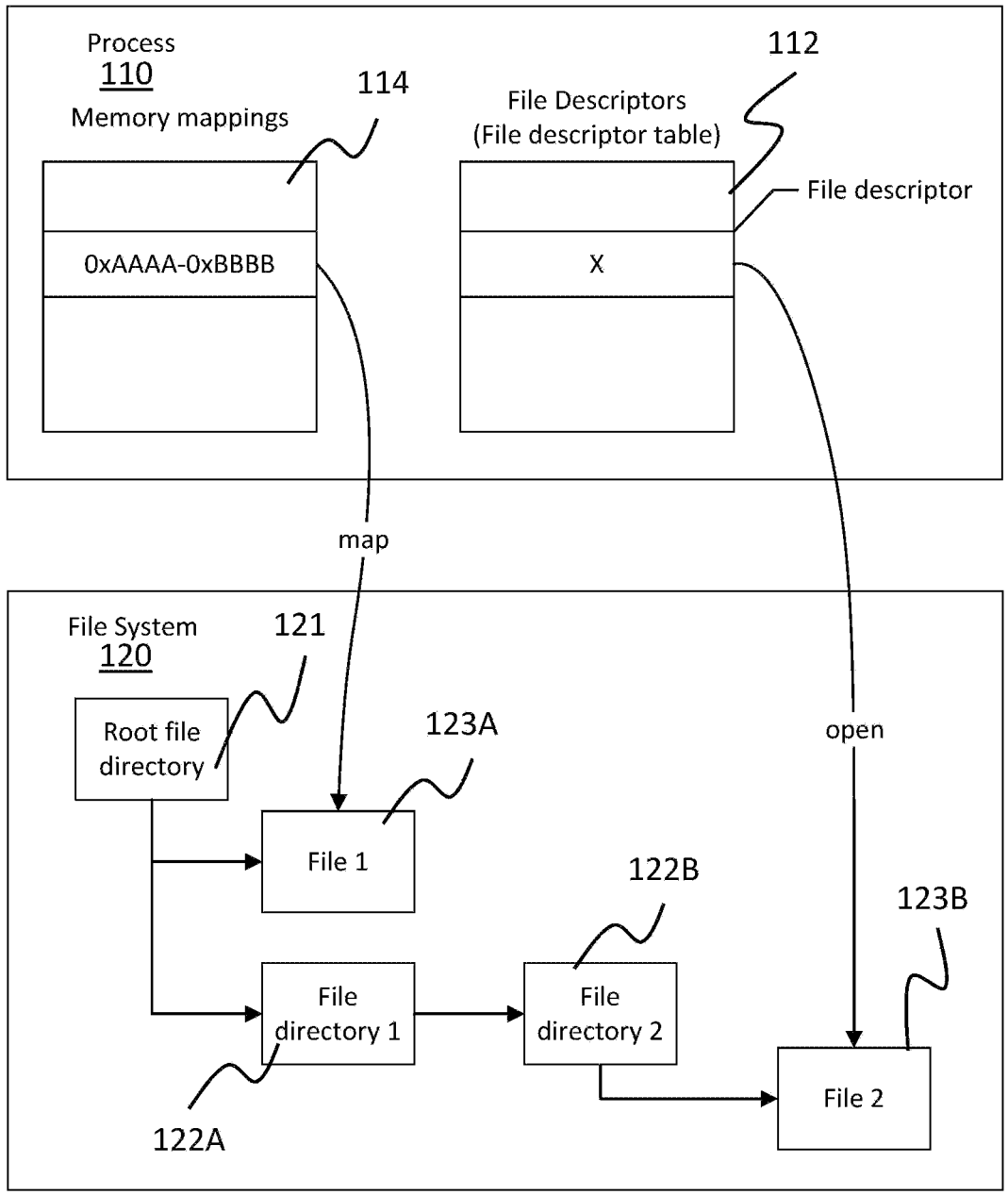
FIG. 2A illustrates a detailed diagram for execution and working with files of a computer process.

FIG. 2A illustrates a detailed diagram for execution and working with files of a computer process. In particular, a memory-mapped file is a segment of virtual memory that has been assigned a direct byte-for-byte correlation with some portion of a file (e.g., file 123A) or file-like resource. For example, in Linux, file mapping is when a file is mapped to address space of a process by a mmap system call. During operation, pages of the file on the disk are copied to memory pages (e.g., RAM). With it, pages in memory transparently reflect corresponding pages of the file on disk. Thus, when a process, such as process 110, is to perform a read (or write) operation from the memory mapped file (e.g., file 123A), it is sufficient to only read (or write) data from the corresponding address in the address space of the process. Moreover, reading and writing to the file can be done without I/O disk operations.

In general, the address range to which the file is mapped is called virtual memory area. Thus, as shown, the task 110 has memory mappings 114, i.e., it has virtual memory areas ("VMA") that includes address ranges that correspond to a memory-mapped files. For example, 0xAAAA-0xBBBB can describe an exemplary address range, i.e., a VMA, that may correspond to a file, such as file 123A. The common example of memory-mapped files is executable binary files. To execute a task, the operating system creates a process, maps the binary file with its code to some address range in the process and then, when the process is running, the CPU executes commands from this address range.

As further shown in FIG. 2A, the FDT (file descriptor table) 112 associated with the task provides references/indicators of the files to which the task has access (e.g., file descriptor ("FD") "X" provides a reference to file 123B) during execution of the task. In general, each file descriptor in FDT 112 is a non-negative integer, generally represented in the C programming language as the type "int". When task 110 is to perform a read or write operation to file 2 (i.e., file 123B), the task 110 performs a system call using the descriptor (e.g., FD "X") from FDT 112, which is used as an argument of the system call. In other words, for many I/O system calls that operates on a file, an argument for the system call is a file descriptor "X". In this instance, the process 110 makes a system call for the "X" file descriptor from the file descriptor table 112 to write to and/or read data from file 123B.

Figure 2B:
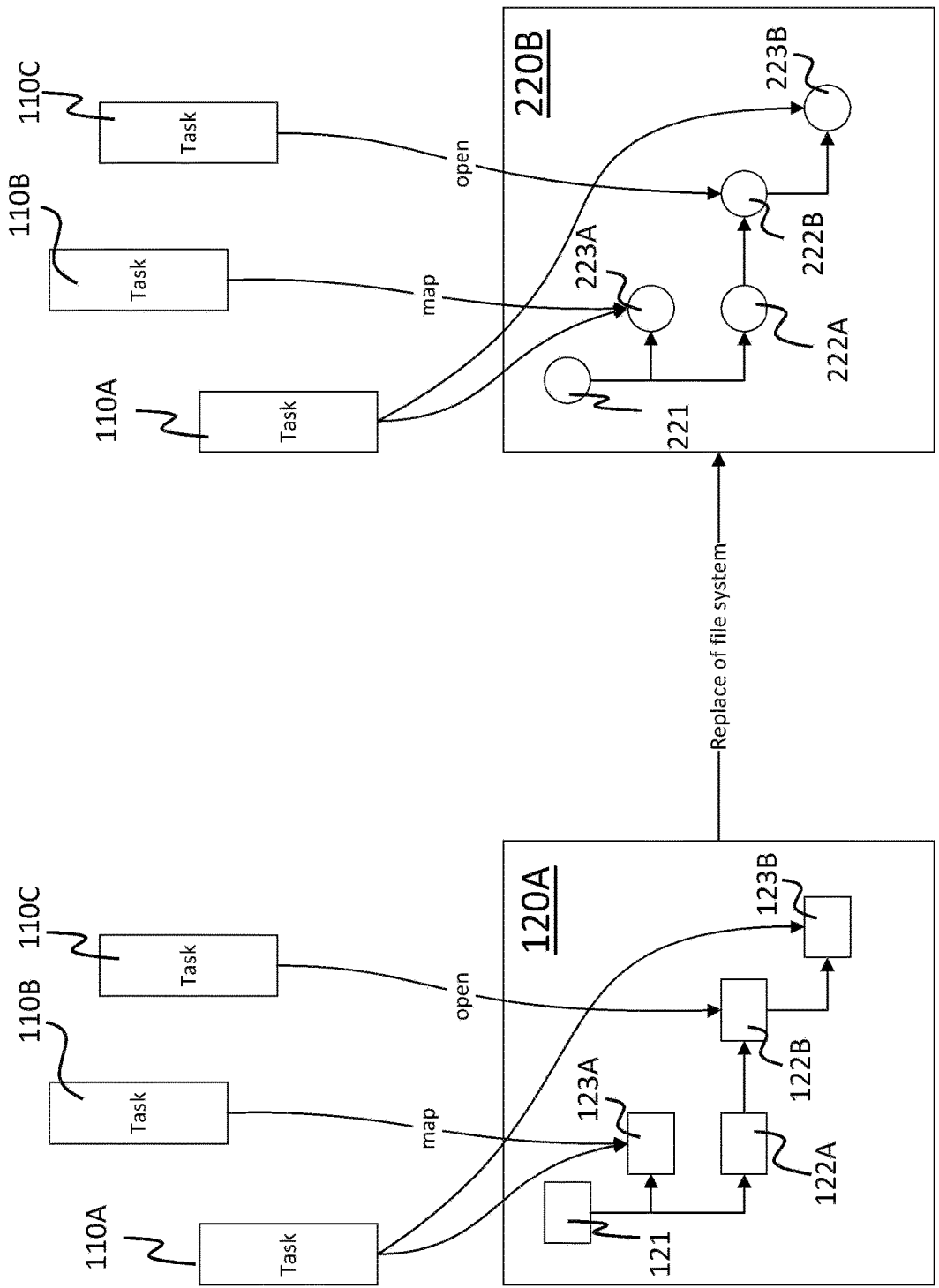
FIG. 2B illustrates a high-level diagram for switching file systems underneath working processes according to an exemplary aspect.

FIG. 2B illustrates a high-level diagram for switching file systems underneath working processes according to an exemplary aspect. As generally shown, there may be one or more tasks or processes (e.g., shown as three processes 110A, 110B and 110C) that are running on an operating system and working with (e.g., reading from and/or writing to; or opening or mapping them) files on a current file system ("FS") 120A. As shown, the FS 120A includes a root file directory 121 and a file system tree that includes file directories 122A and 122B and files 123A and 123B.

In this example, there may be some files on FS 120A (e.g., file directory 122B) that are opened by one or more of the processes (e.g., file directory 122B is opened by task 110C) and one or more files that are mapped to the address space of one or more of the processes (e.g., file 123A is mapped to the address space of task 110B). It is noted that the terms "process" and "task" are used interchangeably herein. As will be described in detail below, in the exemplary aspect, a computing device, server, a user, application, etc., can initiate a replacement of the file system (FS) 120A with the file system (FS) 220B even when there are existing processes that are working with (or somehow using, or at least holding the reference to) one or more files on FS 120A. Advantageously, the file system switching will be done on-the-fly without stopping the processes or waiting while they close files.

In this aspect, a user application running on the computing device, for example, can perform the file system content synchronization to copy content (in some other aspects copying of the content is not necessarily, only some attributes are copied) from FS 120A to FS 220B. The user application can be, for example, a CRIU ("checkpoint/restored in userspace") software tool or similar software application configured to copy file contents and other file system resources from a first file system (e.g., FS 120A) to one or more second file systems (e.g., FS 220B). In a relate example, the contents can be copied by a user via a "cp" command or similar command using such a software application. Thus, for each file used by a task on FS 120A, the user application creates a corresponding file on the FS 220B. Moreover, the user application is configured to send instructions to a file system switcher, which is a separate component that replaces or switches the first file system (e.g., FS 120A) with a second file system (e.g., FS 120B) that has all needed files (it is optional, whether they have the same content or not). As will be described in detail below, the file system switcher provides a service, which can be requested on demand. In other words, the user application can use an interface of the file system switcher to control it to, for example, switch a process to another file system. In this aspect, the file system switcher is not aware of the content on either file system and expects that the content (or at least some attributes, like file paths) is synchronized between file systems. However, the switcher can additionally copy the content or check its correctness, in some aspects.

In any event, referring again to FIG. 2B, all files on FS 120A that were opened by the tasks (e.g., task 110C) running on the system will be closed and corresponding files will be reopened on the FS 220B. In other words, corresponding files from FS 220B should be opened and their file descriptors should replace the file descriptors of the corresponding files from FS 120A in the respective processes' file descriptor tables. In addition, in the exemplary aspect, all files on FS 120A that were mapped to each process's address spaces should be unmapped and the corresponding files from FS 220B (in some aspects, they are identical) should be mapped to the same address ranges in the same corresponding process's address space that earlier corresponded to these files from FS 120A. Thus, broadly speaking any references (e.g., file descriptors, file mappings, file handlers etc.) that process/task uses during execution to work with file system resources, such as an opened or mapped files, or directories, on the existing file system (e.g., FS 220A) will be replaced with references that can be used by the process/task during execution to work with corresponding file system resources, such as corresponding opened or mapped files, or directories, on the new file system (e.g., FS 220B).

Furthermore, the FS 220B preferably should also have the same file system tree and hierarchy as FS 120A. Preferably, files from FS 220B (at least the files corresponding to files from FS 120A with which the processes work) should have the same name and path as the corresponding files on FS 120A. In some exemplary aspects, having the same content is preferable, but in general it is not indispensable, and in some other exemplary aspects, which will be described below, the content of files on file systems that are switched is different. In some exemplary aspects, the whole contents of file systems 120A and 220B are preferably the same. As a result, the "same" tasks (e.g. denoted 110A, 110B and 110C) work with the "same" files (e.g., the name and the content of the files are the same), but these files are located on different file system (i.e., on FS 220B instead of FS 120A). For example, as shown, after migration is complete, task 110C can work with opened file directory 222B and task 110B will work with memory-mapped file 223A from FS 220B.

Figure 3:
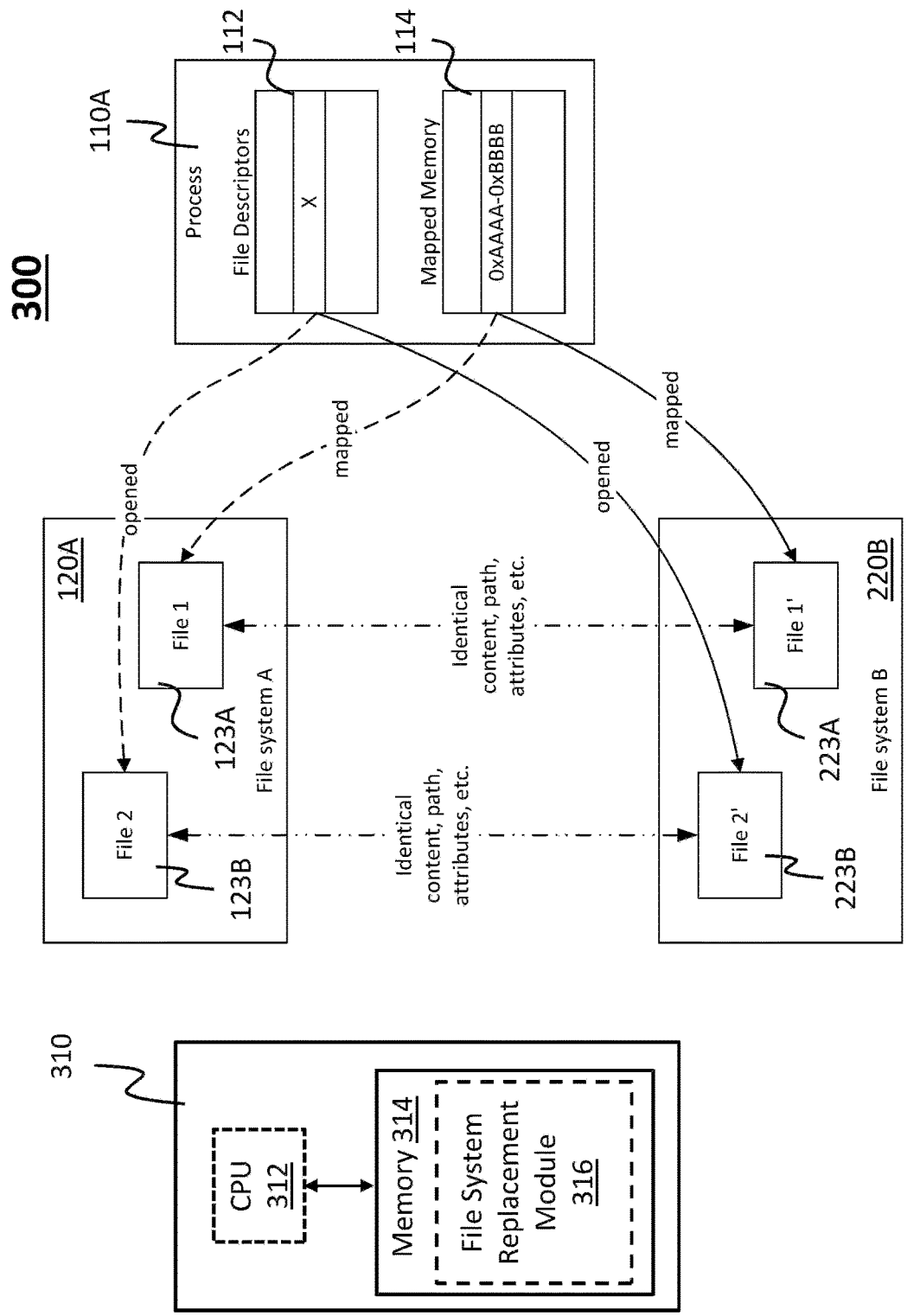
FIG. 3 illustrates a diagram of a system for switching file systems underneath working processes according to an exemplary aspect.

FIG. 3 illustrates a block diagram of a system for switching file systems underneath working processes according to an exemplary aspect. As shown, the system 300 includes many of the same components described above with respect to FIG. 2B. For example, system 300 can include one or more processes/tasks (e.g., process 110A), FS 120A and FS 220B. For purposes of this disclosure, the computer process/task 110A is referred to in describing the exemplary systems and method, but the system 300 can be implemented when multiple processes are working with the files in FS 120A as described above.

According to the exemplary aspect, the system 300 includes a file system switcher 310 that is configured to switch a task/process 110A from FS 120A to FS 220B. Although not explicitly shown, it should be appreciated that file system switcher 310 is configured to communicate (through a network, for example) with each of FS 120A and FS 220B as well as the operating system executing process 110A to manage the file system switching. In one example, task/process 110A can be executed by a computing device in a network and FS 120A and FS 120B can be located on two separate servers in the same or different networks.

As further shown in FIG. 3, the file system switcher 310 can operate on a computing device that includes a CPU 312 and memory 314. In this aspect, the CPU 312 is configured to execute a file system replacement module 316, which performs the file switching algorithms described herein. Thus, the electronic memory 314 can be provided to store executable code that is executed by the CPU 312 to execute one or a plurality of modules configured to perform the algorithms disclosed herein, including the file system replacement module 316. A detailed block diagram illustrating an exemplary computing system on which the file system switcher 310 can be executed is described below with respect to FIG. 7.

In general, it should be appreciated that file system switcher 310 can be executed on a separate computing device and/or server communicatively coupled to FS 120A and FS 220B as well as the host operating system executing the processes that access the files, such as process 110A. In other aspect, the file system switcher 310 may be a software module executed on the same host computing system that is executing process 110A. In some aspects, FS 120A and/or FS 220B can be located on the same computing device as file system switcher and/or operating system executing process 110A.

In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

According to the exemplary aspect, the file system switcher 310 is configured to perform the actions for replacing FS 120A with FS 220B. As noted above, process 110A can represent any running task working with one or more files on FS 120A (or other file resources). During operation, the process 110A can open files (e.g., file 123B) or map files (e.g., file 123A) to its address space. According to the example shown in FIG. 3, file 123A is mapped to the range of addresses in the task's memory range 114 (e.g., denoted by 0xAAAA-0xBBBB), and file 123B is opened using a file descriptor "X" in the FDT (file descriptor table) 112. While only two files 1 and 2 are shown for exemplary purposes, any number of files can be accessed during execution of process 110A. Moreover, each running task may access either file, multiple files, or no files at all, as should be appreciated to one skilled in the art.

In this exemplary aspect, the files and file trees on both FS 120A and FS 220B preferably (but not necessarily) should be identical. The file system switcher 310 is configured to replace FS 120A underneath the running process 110A with another file system (e.g., FS 220B). Because the content of these two file systems are the same, the system provides stable execution of the tasks that worked with the files on FS 120A after switching to FS 220B. Accordingly, the content of files (at least the files with which the process 110A works), the file names, paths, sizes and permission attributes should be preserved (i.e., be the same for corresponding files on both file systems). If the paths are not the same, the process (or, e.g., switcher) will be unable to find the corresponding file on the new file system. Moreover, if the types are not the same, the process will be unable to open the file in the right way. If the size does not correspond, the system will be unable to set the file offset. Without proper permissions, in some cases the system will be unable to open the file at all. Therefore, if these attributes are not preserved, resulting errors can occur in the process 110A. It should be appreciated that to perform a switch, only few of these parameters need to be the same (e.g., only the paths and sizes of corresponding files from FS 120A and FS 220B should be identical according to an exemplary aspect).

Moreover, it should be appreciated that the FS 120A and FS 220B can be arbitrary and different, and there is no limits to the type of file system. For example, it is contemplated that the file system switcher 310 can migrate running process from NFS to SPFS, from NTFS to ext4, and the like.

Further, while the exemplary system and method described herein is explained in terms of tasks and processes working with "files" in FS 120A and FS 220B, the file system switcher 310 can be configured to perform the replacement of arbitrary file system resources (which can include opened and mapped files, but also other file system resources, such as "root", "cwd" and "exe" references of a process, for example) from underneath of running processes from one file system to another file system. In other words, the file system switcher 310 is configured to release disk resources used by the first FS 120A to provide, for example, hardware maintenance, switching of computing resources from local to remote (e.g., cloud) file systems, the temporary suspension of all process file operations (e.g., by switching to blocking file system), and the like. In addition, the exemplary system and method can also provide for the migrating of processes (including migration of virtual machines and containers), including using network/distributed files systems (like NFS—Network File System, or similar file system) to switch to the other server containing same data. For purposes of this disclosure, file system resources include opened files, file mappings, "cwd" link (referenced to "current working directory" of the process), "root" link (reference to root directory of the process, i.e., topmost directory of file system tree, visible by the process), executable file (exe, elf) (e.g. reference to a binary file, executed in process) and the like. Moreover, for opened objects, such as open file descriptors that correspond to files opened by the processes, kernel objects should store all needed information about the opened file (e.g., path, attributes, permissions, etc.). It is noted that here (as well as in Linux), the term "file" is applicable to file on disk, socket, and the like.

According to the exemplary aspect, the file system switcher 310 is configured to connect to the process(es) (e.g., task 110A) and perform the switching between FS 120A and FS 220B. In one aspect, if the file system switcher 310 cannot identify the needed files on FS 220B, the file system switcher 310 can generate an error code, which can be displayed on a monitor to the user/administrator, for example. In one other aspect, the switcher can in such case additionally create the needed files on FS 220B, e.g. by copying them from FS 120A.

Figure 4:
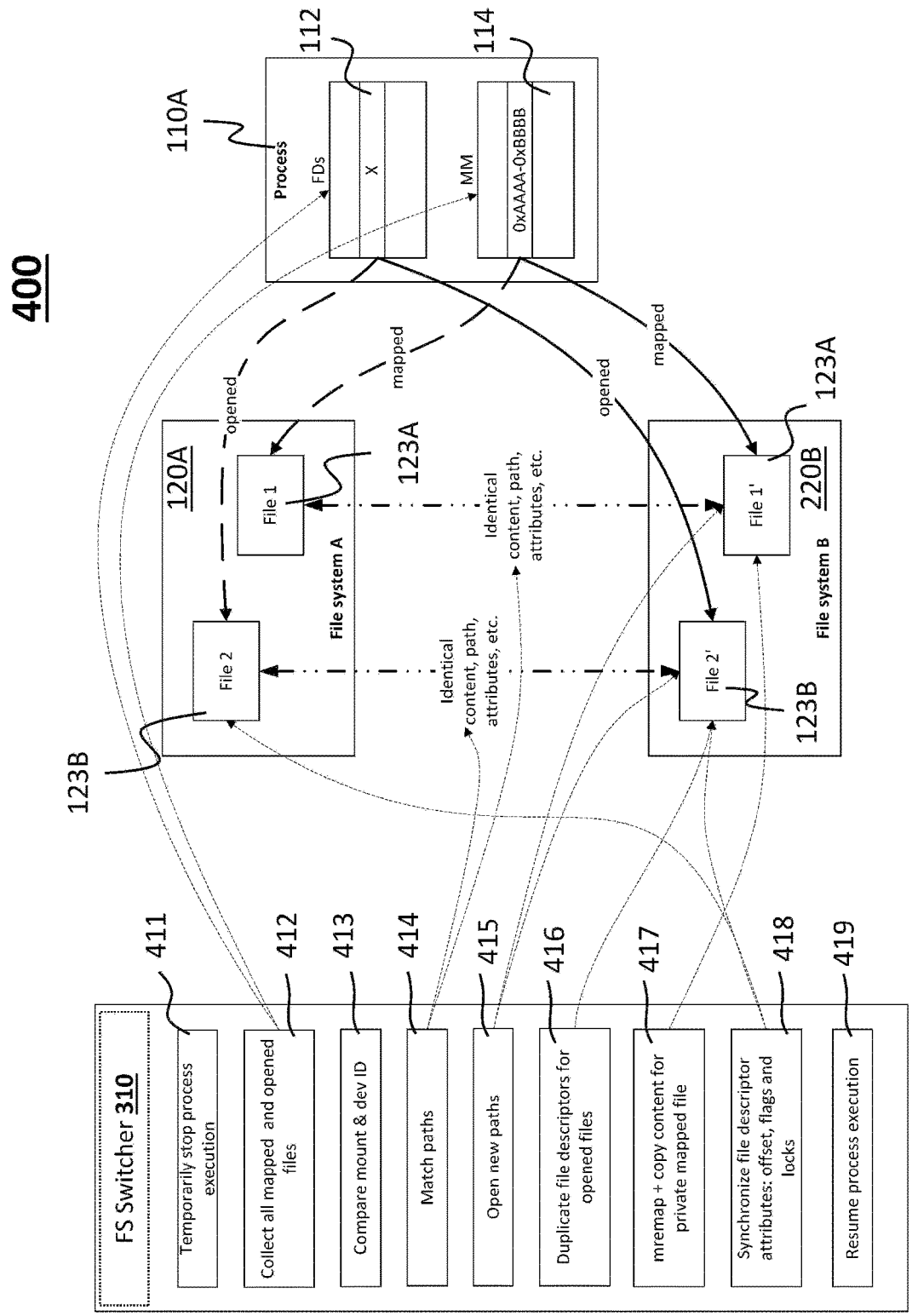
FIG. 4 illustrates a diagram for a method for switching file systems underneath working processes according to the exemplary aspect.

FIG. 4 illustrates a flow diagram for a method for switching file systems underneath working processes according to the exemplary aspect. As shown, the flow diagram 400 is provided for the system 300 that includes many of the same components described above with respect to FIG. 3. According to the exemplary aspect, there are two file systems 120A and 220B, and at least one process/task 110A that is being executed by an operating system and initially working with files 1 and 2 (i.e., files 123A and 123B) on FS 120A. Moreover, it is contemplated that the file system switcher 310 has received a control instruction (e.g., from an application, user, etc.) to replace FS 120A with FS 220B. Thus, there are also files 1' and 2' on FS 220B that have been previously created (as described above) by a user application, such as CRIU, and that preferably contain identical content to files 123A and 123B on FS 120A, and have identical path, attributes, and the like.

Furthermore, the file system switcher 310 is configured to execute the file system replacement module 316, as described herein, which executes a number of processing steps (collectively a file system switching algorithm) to perform a switching from FS 120A to FS 220B. Thus, as shown, initially, the file system switcher 310 is configured to identify all processes (e.g., processes 110A) that are working with one or more files on FS 120A and temporarily stop (i.e. suspend) the processes at step 411. In this aspect, file system switcher 310 can obtain information about all running processes from an operating system, and from among the running processes, identify the processes that are working with (or at least holding reference on) files on FS 120A during execution of that process.

In one aspect, the file system switcher 310 stops task execution at step 411 using, for example, Compel library, ptrace or the like to temporarily stop the process 110A. (Process 110A is describes here as an example, though these actions are performed with each process working with files on FS 120A.) In general, Compel is a software utility provided to execute arbitrary code in a context of a foreign process. Compel is part of CRIU and works by connecting to the process 110A using a debugging program interface of the operating system and stopping the process 110A as if it is interrupted at the breakpoint. Thus, to stop the process at step 411, Compel, ptrace or any other tool providing the same functionality can be used. After the process is stopped, at step 412, the file system switcher 310 is configured to obtain information about all files (e.g., files 1 and 2 in FS 120A) that are used by the task 110A, i.e., the currently mapped and opened files. For example, in one aspect, the file system switcher 310 can obtain this information using a "proc file system" that contains information about all running tasks, and checking "proc/map-files" and the "proc/fd". In general, it is noted that the proc filesystem ("procfs") is a special file system in Unix-like operating systems that presents information about processes and other system information in a hierarchical file-like structure, for example.

Once this information is obtained, the file system switcher 310 at step 413 can compare device IDs and/or mount IDs. In general, a device ID is an attribute that applies to a superblock of a file system. Each file system, including FS 120A and FS 220B, has a unique device ID. A mount ID is an attribute that applies to mount point, which is a point of access to a particular file system. As such, there is only one device ID per file system, but there can be multiple mount points per file system (each one with a unique mount ID).

According to one exemplary aspect, a device ID obtained from result of a system call "stat" on the file descriptor can be compared with the device ID of the target file system that is being replaced (e.g., FS 120A). If device ID on the file descriptor matches the device ID of the target file system, the file system switcher 310 can determine that the corresponding file system resource has to be replaced.

In another aspect, the mount IDs can be used to replace a mount point of a file system. The following file system tree provides an example of this aspect:

/
 -dir1/
  -/old_mnt
 -/dir2
  -/new_mnt

In this example, a first file system (e.g., FS 120A) is mounted in both "/dir1/old_mnt" and "/dir2/new_mnt" dentries. Moreover, the file system switcher 310 is requested to switch a process from working with "/dir1/old_mnt" to "/dir2/new_mnt", for example, because "/dir1" is also a mount point of another file system that the needs to be released, but cannot be released until the first FS 120A is mounted to nested "old_mnt/" directory. The device ID cannot be used as a criteria because it will be the same for both mount points, and thus, the file system switcher 310 cannot distinguish whether this file is opened in "old_mnt/" or "new_mnt/" directories. Thus, in this aspect, the file system switcher 310 can compare mount IDs that can be gained from /proc/<pid>/fdinfo/<FD_NR>. If the mount IDs are the same, then the file system switcher 310 can identify the corresponding resources that need to be replaced according to the algorithm described herein.

Next, at step 414, the file system switcher 310 is configured to check whether the paths (with the names) of the files from FS 120A exist on FS 220B. In other words, the file system switcher 310 is configured to determine that the file paths for the files on FS 120A match the file paths of the corresponding files on FS 220B (at least paths of those files, with which the process works). In addition, each file on FS 220B that corresponds to any file on FS 120A (i.e., file 1' corresponding to file 1) should have both the same path and name (in some aspects, path also comprises name) as well as the same type (e.g., usual file, socket, and the like).

At step 415, the file system switcher 310 opens files on FS 220B that correspond to files on FS 120A used by the process 110A. In particular, the step is done by opening the paths of the files on FS 220B. Then, at step 416, the file system switcher 310 replaces the opened files from FS 120A with the opened files on FS 220B for the task 110A. The file system switcher 310 performs step 416 by replacing file descriptors (in FDT 112 of task 110A) for files on FS 120A opened by process 110A by file descriptors of the files on FS 220B opened on the step 415. For example, a file descriptor of file 2 will be replaced by a file descriptor of file 2' in the file descriptor table of task 110A. (This replacement can be performed by dup 2 (or dup 3) system call, for example. In this aspect, the system call makes the new file descriptor to be the copy of the old file descriptor (and closing the old file descriptor, if necessary). After a successful return from one of these system calls, the old and new file descriptors may be used interchangeably.) This means that the first file descriptor is closed (i.e. file 2 is closed) and the second file descriptor is written to the file descriptor table 112 of task 110A in place of the first file descriptor (i.e., under the same index in the table). In the exemplary aspect, the closing of the file descriptor for file 2 and writing of the file descriptor for file 2' to the index in file descriptor table is done atomically.

As further shown, file 1 (i.e., file 123A) is mapped to the virtual memory area in the process's 110A address space. The file system switcher 310 is configured to send the file descriptor of the corresponding file on FS 220B (i.e., file 1') to the process 110A. The file 1' on FS 220B should have at least certain attributes that are the same as the attributes of file 1, such as, for example, the same path (name), type, size, and permissions, as described above. To create a file mapping for the file 1', the file 1' will be mapped to another address range in the address space of the process 110, but its mapping should have the same size as the mapping of file 1. Then, the file system switcher 310 replaces the mapping for file 1 by the new mapping for file 1' by remapping (e.g., using an mremap system call) new mapping on top of the old mapping. When remapped, the old mapping is unmapped and file from FS 120A is closed atomically (i.e., file 1 is unmapped, and file 1' is remapped to the address range of the mapping of file 1 by an mremap system call, for example).

Furthermore, it should be appreciated that mapped files have additional attributes, such as address range, mapping flags, permissions, and the like, and file mappings can be private or shared. Private file mapping can be seen only by one process/task, so changes are not written to the file on disk until a special command is received. If such file is unmapped unexpectedly, changes can be lost. Shared file mappings are seen for a group of processes, i.e., a group of processes can read, execute or write to such files. In this case, all changes done by one process are immediately available to other processes of the group, and, all changes are written to disk immediately. Moreover, in the case of shared mappings, the file is mapped to different address ranges (e.g., in different VMAs (virtual memory areas)) in different processes.

According to the exemplary aspect, if the mapping of file 1 is private and the process 110A could write to it, then the contents of the file mapping 1 are copied to the file mapping 1' before the file 1 is unmapped from process 110A. In one atomic operation according to an exemplary aspect, the file 1 is unmapped (i.e., the file mapping 1 does not exist anymore) and the file mapping 1' of the file 1' is moved (remapped) to the range of addresses that belonged to file mapping 1. Thus, unmapping of file 1 and remapping of file 1' are done atomically (i.e. in one atomic operation).

At step 418, the file system switcher 310 synchronizes file descriptor attributes, including file offset, flags and locks (e.g., move flocks from proc/locks). On this step, the attributes of new file descriptors (of the files on FS 220B) are set to the values that the corresponding old file descriptors (of the files on FS 120A) had. Once the synchronization is finished, the file system switcher 310 can cause the process 110A to continue its execution at step 419. In this manner, the process 110A can now access the files 1' and 2' from FS 220B as a result of the switching process where files 1' and file 2' on FS 220B correspond respectively to files 1 and 2 on FS 120A as described above.

Figure 5:
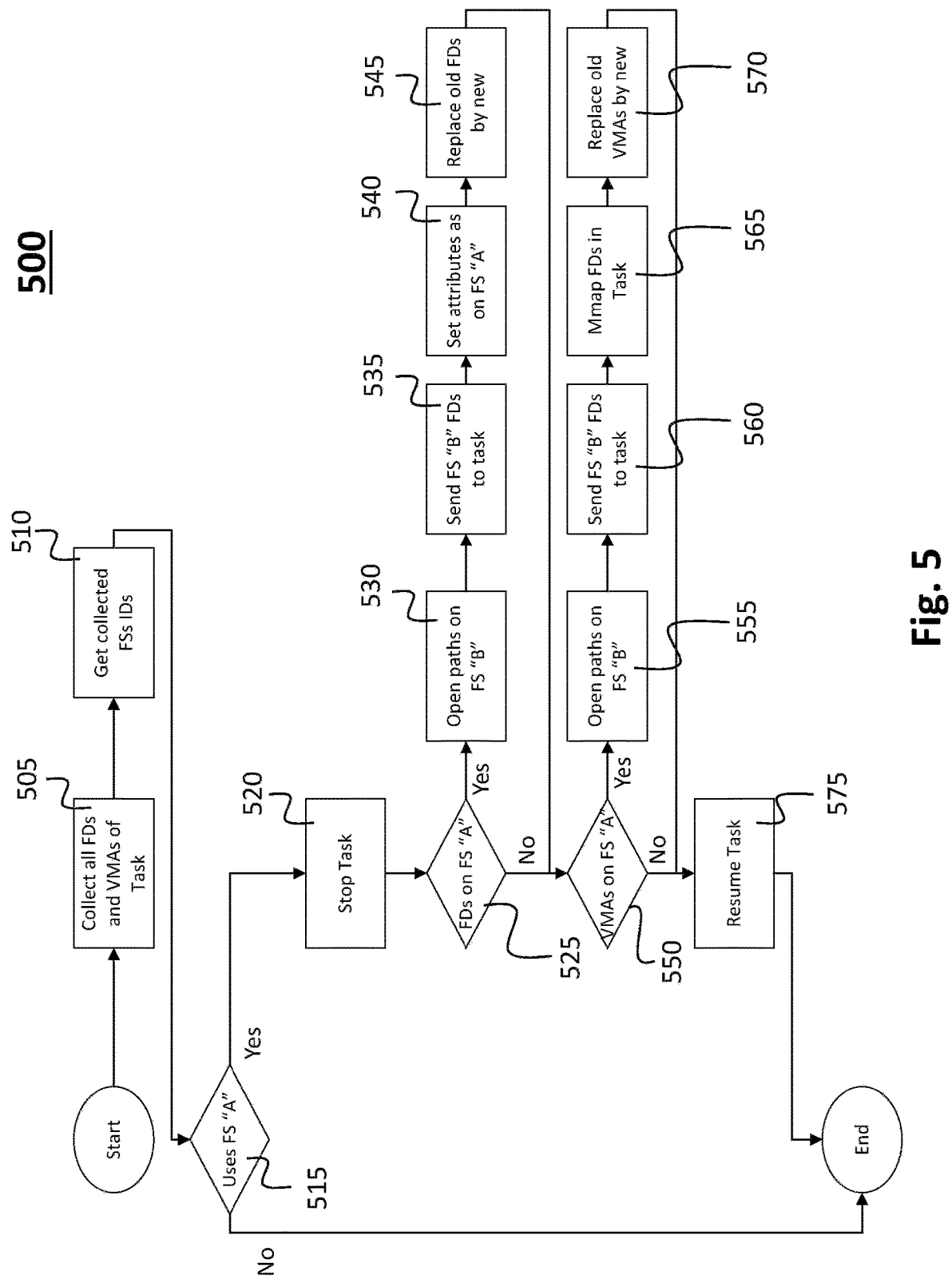
FIG. 5 illustrates a flowchart for a method for switching file systems underneath working processes according to an exemplary aspect.

FIG. 5 illustrates a flowchart for a method 500 for switching file systems underneath working processes according to another exemplary aspect. In this example, the file system switcher 310 is described to be working with one task 110A similar to the examples described above. However, it should be appreciated that to replace any file system, such procedure should be performed with each process being executed on the host system(s) that is working with one or more files on the file system (e.g., FS 110A) that is being replaced.

As shown, the method initially begins in response to a request to replace/switch FS 120A with FS 220B. That is, in the exemplary aspect, the file system switcher 310 can include an external interface that waits for instructions from a user and/or application (e.g., CRIU) to perform the file switch. Upon receiving this instruction, at step 505, the file system switcher 310 identifies all file descriptors and all virtual memory areas of the process 110A for files on the current file system that it is working with (e.g., FS 120A) during its execution on the operating system. In addition, in one aspect, the file system switcher 310 can also collect, for example, "cwd"—the current directory, "root"—file system root, and "exe"—file descriptor of the process's execution file. Next, at step 510, the file system switcher 310 filters those opened files and file mappings that need to be replaced. As described above, this filtering can be performed using the device ID (i.e., file system IDs). As described above, each device (which can be virtual) will have a unique device ID, such device IDs associated with two different files residing on different file systems (e.g., file systems 120A and 220B) will be different. In this step, the file system switcher 310 can filter all opened and mapped files based on the device IDs (or in some aspects mount IDs, as was described above), such that the file system switcher 310 can determine all file systems (e.g., FS 120A) used by the task 110A. Thus, the file system switcher 310 will therefore be able to identify the files that are stored on FS 120A (i.e., the file system being replaced/switched) and used/accessed by the task 110A.

Thus, (for example, based on the comparison of IDs) the file system switcher 310 will determine if the task 110A is currently using any of the files (e.g., files 123A and/or 123B) on FS 120A at step 515. If not, the file system switcher 310 will not perform any further steps regarding the control of the task 110A and the method will end. Otherwise, if the task 110A is working with at least one file stored on FS 120A, the method proceeds to step 520 where the file system switcher 310 temporarily stops (i.e., pauses or suspends) the task 110A, as described above, using the Compel library, for example.

Next, at step 525, the file system switcher 310 determines if there are any file descriptors in the FDT that reference files on FS 120A that are opened by the task 110A. If so, the method proceeds to step 530 and opens the paths of the files on FS 220B that correspond to the opened files on FS 120A used by task 110A. For example, according to an exemplary aspect, this procedure can be done inside the task 110A by loading an executable binary blob with "parasite" code (which will open the needed files) into the task 110A and then executing this code.

In one example, the system can create "parasitic" code using Compel, which is then compiled and linked using the Compel utility. In this aspect, the parasite code can be executable binary code (e.g., binary blob containing instructions) that is inserted into the running process and then executed. Thus, once compiled with Compel flags and linked, the parasite code can be loaded into and executed in the task 110A with the help of Compel library. Thus, the operation of the parasite code occurs when its executable binary code is executed in the context of the running process. In another aspect, the files on FS 220B are opened by the file system switcher 310 and then the file descriptors of the opened files are sent to the 110A task via a socket, for example, at step 535.

At step 540, the file system switcher 310 obtains the attributes from the files on FS 120A (e.g., offset inside the file, locks, permissions, and the like) and sets the corresponding attributes of the files on FS 220B to the same values. Then, at step 545, the file system switcher 310 can replace the old file descriptors for task 110A (which are references for the files on FS 120A) with new file descriptors (of files on FS 220B) using a dup 2 (or dup 3) system call, for example, as described above. In other words, at step 545, the file system switcher 310 is configured to close the original file descriptor of the file (e.g., the opened file 123B) from FS 120A (i.e., the file is closed) and write a new file descriptor (of the file from FS 220B) to the file descriptor table 112 of the task 110A in place of the original file descriptor (i.e., under the same reference, such as file descriptor "X"). The closing of the original file descriptor and writing of the new file descriptor to the same index is done atomically according to the exemplary aspect.

Next, the method will proceed to step 550. It should also be appreciated that, as shown, if there are no file descriptors for task 110A that reference one or more files on FS 120A, as determined at step 525, the method will proceed directly to step 550 and skip steps 530-545. In either event, at step 550, the file system switcher 310 will determine if there are any files in FS 120A that are mapped to the address space of the task 110A. More particularly, if there are file mapping of a file on the FS 120A, the method proceeds to step 555 in which file system switcher 310 opens paths on FS 220B, which is the same step as for the opened files (e.g., file 123B) described above for step 530.

Then, at step 560, the file system switcher 310 sends the file descriptors of the newly opened files on the FS 220B to the task 110A (in some aspects, steps 555-570 can be done using "parasite" code like 530-535, as was described earlier). Next, at step 565, the file system switcher 310 further executes an mmap system call to map these files to the task's 110A address space (in some aspects, this also can be done by executing "parasite" code inside the process 110). In this regard, the new file mapping (of the file from FS 220B) is created in the task 110A (in the virtual memory area, for example) and its attributes are set equal to the attributes of the existing file mapping (of the file from FS 120A). If the old mapping was private and writable, its content is then copied to the new mapping. At this step, ranges of addresses of these two mappings are different. The file system switcher 310 (or "parasite" code) then replaces the old mappings by new mappings at step 570. When the old mapping is unmapped, the file from FS 120A is closed and the new mapping is remapped to the range of addresses of the old mapping. Finally, at step 575, the file system switcher 310 resumes the task 110A using Compel or a similar software application, as described above. It should be appreciated that if there are no mapped files for task 110A in FS 120A, the method proceeds from step 550 directly to step 575 and skips steps 555-570.

In addition, in an exemplary aspect, it is contemplated that FS 120A and FS 220B and the files on the file systems are ready before the file switching process is initiated (i.e., the method shown in FIG. 5 begins). That is, in this aspect, the CRIU or similar software application as described above copies the content from FS 120A onto FS 220B. Thus, before the file switching starts by the file system switcher 310, all needed files with the correct parameters have already been created on FS 220B, such that these files have the required paths and can be referenced by the file system switcher 130 accordingly.

Figure 6:
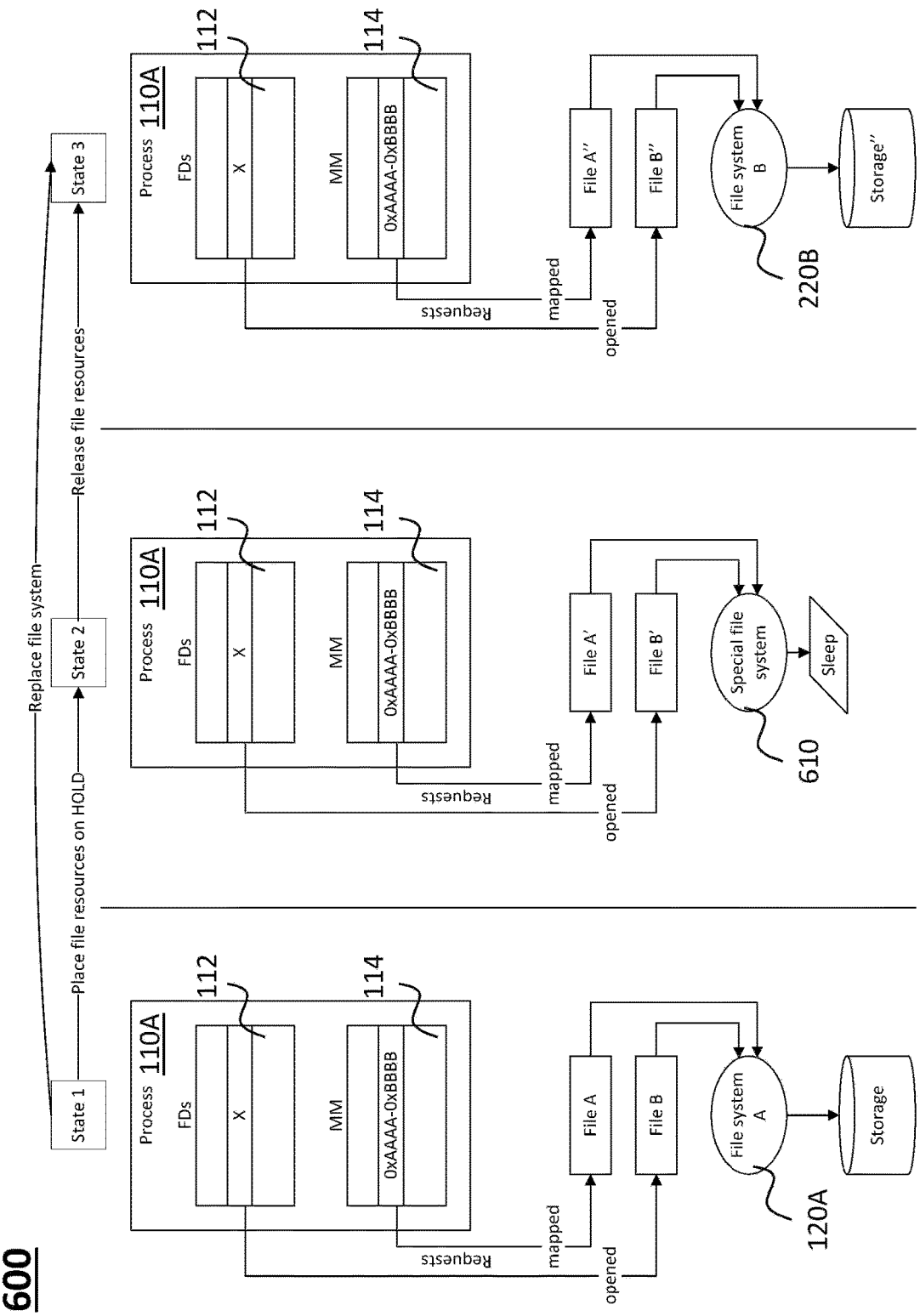
FIG. 6 illustrates a state diagram for switching file systems underneath working processes according to another exemplary aspect.

FIG. 6 illustrates a state diagram of a system for switching file systems underneath working processes according to another exemplary aspect. As shown, the state diagram 600 includes many of the same components described above with respect to FIGS. 2-3. For example, the exemplary system can include one or more processes/tasks (e.g., process 110A), FS 120A and FS 220B. Moreover, although not specifically shown, the system includes the file system switcher (e.g., file system switcher 310 described above) that performs the replacing of FS 120A with FS 220B.

According to the exemplary aspect, a special (intermediate) file system 610 is provided (hereinafter referred to as SPFS 610, which is a "Stub Proxy File System" as noted above) to facilitate the switching between FS 120A and FS 220B. According to an exemplary aspect, the SPFS can be a file system in userspace (i.e., a "FUSE") file system. Moreover, according to the exemplary aspect, the SPFS (like any file system) does not create or modify files, but only provides such functionality to a user. The SPFS waits for user requests (e.g., for creating, opening files, I/O operations) and handles the requests depending on whether it is operation in a "stub" or "proxy" mode, the details of which will be described below.

As described above, to switch the file systems, the file system switcher 310 can coordinate the switching of the files directly to the new FS 220B. However, according to another exemplary aspect, if there is no data on new FS 220B (e.g., if the data should be obtained by network like for NFS), the file system switcher 310 can perform the switching from the first FS 120A to the intermediate file system 610, and then, when the data on second FS 220B is ready, switch to second FS 220B.

Thus, in the exemplary aspect of FIG. 6, SPFS 610 is a special file system that has two modes: (1) "proxy" mode; and (2) "stub" mode and is managed by file system switcher 310, although it can have an external interface such that it can be managed by other software applications. In the proxy mode, SPFS 610 redirects any attempt by a process to access the data on it to real data that can be located elsewhere (e.g., on other FS, or on a local file system tree). In the stub mode, SPFS 610 suspends/pauses any process that tries to access/read/write data, causing the process to temporarily enter a sleep mode. Moreover, in some exemplary aspects, SPFS 610 does not contain the data itself (though there can be files with right paths and other attributes, but without the real data in the content), but is provided to receive access attempts by a process (e.g., task 110A) to one or more files on SPFS and can either suspend executing of the process or redirect data access depending on its current mode of operation.

According to the exemplary aspect of FIG. 6, SPFS 610 can be used when, for example, if the FS 220B is a NFS and the data contents, file paths, etc., are not accessible (if it locked or, if there is not internet access yet, or the like, for example). In this aspect, the replacement procedure can be performed in two steps. First, the FS 120A is replaced by SPFS 610 on which the processes (e.g., process 110A) are temporarily suspended (i.e., controlled to enter a sleep mode) on any attempt to access files (e.g., files 123A and 123B) or the access requests are redirected. Then, SPFS 610 is replaced by the FS 220B. For example, in the exemplary aspect, once the data and attributes from FS 120A have been fully restored on FS 220B, the application performing this copying (e.g., CRIU) can instruct the file system switcher 310 to replace the SPFS 610 with the FS 220B. In other words, once the FS 220B has the resources/content originally stored on FS 120A, the file system switcher 310 can consider the content synchronization complete and resume (restart execution of) any suspended processes (e.g., task 110A) to begin working with the files on FS 220B, as described above.

According to the exemplary aspect, the system is shown to transition through three separate states. In particular, state 1 can be considered an initial state of system before the process of file switching is initiated by an application or user. Thus, in state 1, when a task or process (e.g., process 110A) is running and attempts to access data of the file (e.g., files 123A or 123B), the process 110A, using file descriptor 112 or file mapping 114, for example, determines on which file system the file is located, and performs some operation (e.g., access, read, write, etc.) on data from storage (i.e., block device, etc.) using the file system interface (of FS 120A).

Then, in state 2, the file system switcher replaces the FS 120A by the special file system 610 (i.e., SPFS 610). In this state, it can be said that the file resources are placed on hold, meaning that the process is not terminated, but it continues execution while it does not try to access files put on hold. In an exemplary aspect, a separate software daemon is configured to control the file system access by switching the SPFS 610 to "stub" mode, for example. Thus, while SPFS 610 is in the "stub" mode, when process 110A (or any other process) attempts to access data (e.g., any read and/or write of any change to file metadata like changing size, access permissions, and the like) from any file (e.g., file 123A and/or 123B) on the SPFS, the kernel places the process in a sleeping state while waiting for data (or, for example, a command) from the SPFS 610. This SPFS behavior helps to avoid execution errors in processes during migration from FS 120A to FS 220B.

Finally, once the file system switcher 310 receives an instruction that the data content and attributes on FS 220B are ready (i.e., the contents of FS 220B match the contents of FS 110A), it performs switching to FS 220B. During it, the file system switcher 310 changes SPFS mode so that the SPFS can reply to kernel and then the kernel can control the process 110A to exit the sleeping state and begin working with the files on FS 220B. Thus, in state 3, when process 110A subsequently attempts to access the file (e.g., file 123A and/or 123B) (by a read or write operation, for example) the process 110A will access the file from FS 220B correctly after the file system switching process is complete. It should be appreciated that the process 110 does not recognize any differences between files A, A' and A", because the whole procedure is transparent for the process 110.

It should be appreciated that in this exemplary aspect, the switching is performed first from FS 120A to SPFS 610 and then from SPFS 610 to FS 220B. In this case the steps of algorithm shown on the FIG. 4 are the same, though the algorithm is repeated twice. First, the method is the same, but SPFS 610 is used instead of FS 220B (here the contents of the files are not identical). Then, the algorithm is performed again as described above, but SPFS 610 is used instead of FS 120A.

Moreover, in an exemplary aspect, SPFS 610 is a "FUSE based" file system meaning that it works in userspace according the exemplary aspect, as described above. In other words, when a process (e.g., task 110A) issues, for example, a read request of a specific file, this request goes to the kernel, first to the FUSE file system driver. Then, the FUSE file system driver sends this request back to userspace to a special process, which can be referred to as a "FUSE daemon" or "FUSE master", for example. In general, a FUSE-based files system (e.g., SPFS 610), requires a user-space program, which executes a FUSE file system mount, providing itself as the "FUSE master" for the FUSE mount if it requested from the kernel (i.e., waiting for the request from kernel, processing the request, and then sending the results back to kernel FUSE driver). The running userspace program (e.g., the "FUSE daemon" or "FUSE master") can be considered a "SPFS process" (or daemon) as described herein. This process can contain a plurality of threads in a given arbitrary moment in time because it creates a thread per each file system request received from the kernel. In other words, if only one process is attempting to access a FUSE file system, then it will be only one thread in the "SPFS process". If there are many processes attempting to access SPFS 610 simultaneously, then the SPFS process will have many threads. According to the exemplary aspects, the SPFS process waits for user requests to access files (e.g. for creating, opening files, I/O operations and the like) and handles them according to the particular mode, i.e., "proxy" mode or "stub" mode.

In a particular aspect, SPFS 610 can be used for migration of a network file system (NFS) mount point within a container. For example, in some instances, the NFS is unavailable (i.e., it cannot be mounted) because the container network is locked. As a result, no related files and/or other resources can be opened and assigned to the restoring processes. Thus, the complete restore of a container cannot be performed because of the NFS unavailability. In this instance, SPFS 610 can be used in which content is prepared on the SPFS (content means file paths, sizes, access modes and locks, but not the actual data). Then, once the NFS becomes available, the file system switcher 310 can mount the NFS (e.g., FS 220B) and replace all of the process's file system resources (i.e. opened or mapped files), located on SPFS 610, by corresponding NFS resources (including locks, file position, and the like). Thus, the SPFS 610 can effectively serve as a temporary replacement file system for the NFS during container restore, for example.

The exemplary container migration in this aspect is performed by the file system switcher 310 using SPFS 610 as follows. First, the user application (e.g., CRIU) will request the file switching process to mount the SPFS 610 in the "proxy" mode to the path where the NFS will be mounted later. The user application then creates all the paths (i.e. creates files, e.g., without content) it needs to open/mmap the files (i.e., paths of those files located on the original file system, such as FS 120A, that were used, opened, mapped, by the process, which will be migrated) on the SPFS 610. Preferably, at least some attributes of the new file should be the same as corresponding attributes of the file on FS 120A, including at least the file names. Additionally, other attributes can also be set to values of corresponding attributes of the file on FS 120A, such as path, size, permissions, and the like. In one aspect, the data contained in the file on FS 120A can be copied to the new file in the temporary directory, but it is not required to include this data. In fact, the data is preferably not included in the temporary directory and the files do not even have the same size as the file on FS 120A. In a refinement of this aspect, if the size attribute is preserved, but the data is not preserved, then such files can contain rubbish only to provide files of the same size.

Since SPFS 610 is mounted in "proxy" mode, when the user application (e.g., CRIU) attempts to open a file on FS 120A, the SPFS process will redirect all requests to the temporary directory (e.g., /temp directory) in which a temporary file system can be mounted. In this aspect, SPFS 610 redirects all requests to the temporary file system on which the user application has created the new files. Thus, the user application can open these new files using SPFS 610. On file opening, kernel objects (some service structures) and file descriptor (FD) for this file can be created.

Next, the user application (e.g., CRIU) can instruct the file system switcher 310 to switch the SPFS 610 from "proxy" mode to "stub" mode. Once the SPFS 610 is in "stub" mode, it is noted that the new files on the temporary file system are no longer used and can optionally be deleted. As further described above, in "stub" mode, the kernel will subsequently cause a process that attempts to access a file on FS 120A to be temporarily suspended in a sleep mode. In other words, the requesting process is suspended in the kernel awaiting data from the SPFS 610 and remains suspended until the SPFS 610 is switched back to proxy mode.

According to an exemplary aspect, if the SPFS works in "stub" mode, and if a task (e.g., task 110A) send a system call (e.g., "read", "write") and use a file descriptor as an argument of the system call, it enters a sleep state. The system call comes to the driver of the FUSE file system and then to file system process. Moreover, since the SPFS daemon works in userspace, as noted above, the system call comes to the FUSE driver in the operating system kernel and then the request is transmitted to userspace to the SPFS daemon that will handle the request.

Once the user application (e.g., CRIU) finishes its operations, it can release the container (i.e., it is now considered to be successfully migrated) and instruct the file system switcher 310 to replace the SPFS 610 with the NFS (e.g., FS 220B) just before exiting. In response to this instruction, the file system switcher 310 is configured to mount the requested NFS within the container, freeze the whole container, replace the SPFS mount point with an NFS mount point, and then replace all of the SPFS files by corresponding NFS files as described above. The container can then be released and the migration can be considered complete.

Based on the foregoing description of exemplary aspects, it should be clear that SPFS 610 handles the requests from a process/task differently depending on which mode it is operating in. As noted above, the SPFS process can be considered an SPFS daemon in userspace and has threads that handle data access requests. As described above, in the "proxy" mode, the thread redirects the requests back to the operating system kernel and then to another file system (e.g., the temporary file system). Moreover, in the "stub" mode, the thread that is handling the request is configured to sleep on synchronization mechanism (e.g., mutex or semaphore) until the SPFS 610 is switched to "proxy" mode. The process that has sent a request waits in the kernel for the response from the SPFS daemon and, the handler thread of the SPFS daemon sleeps on the synchronization mechanism in userspace, which effectively causes the process that has sent the request to enter a sleep state, i.e., the process is temporarily suspended. After the SPFS daemon has switched modes, the thread exits with special error code. The SPFS daemon is configured to catch errors with this code, determine that there was mode switching accordingly, and restart the operation of the task/process, as if this request had just been received. When the SPFS daemon is operating in "proxy" mode, such file requests from the process/task will be redirected to a real file. Thus, in the exemplary aspect, the SPFS 610 can switch dynamically between "proxy" mode and "stub" mode, which allows for the CRIU and file switcher 310 to create and open files (which are essential for the container restore) and then block access to them (by switching to the "stub" mode) within the same mount point.

Figure 7:
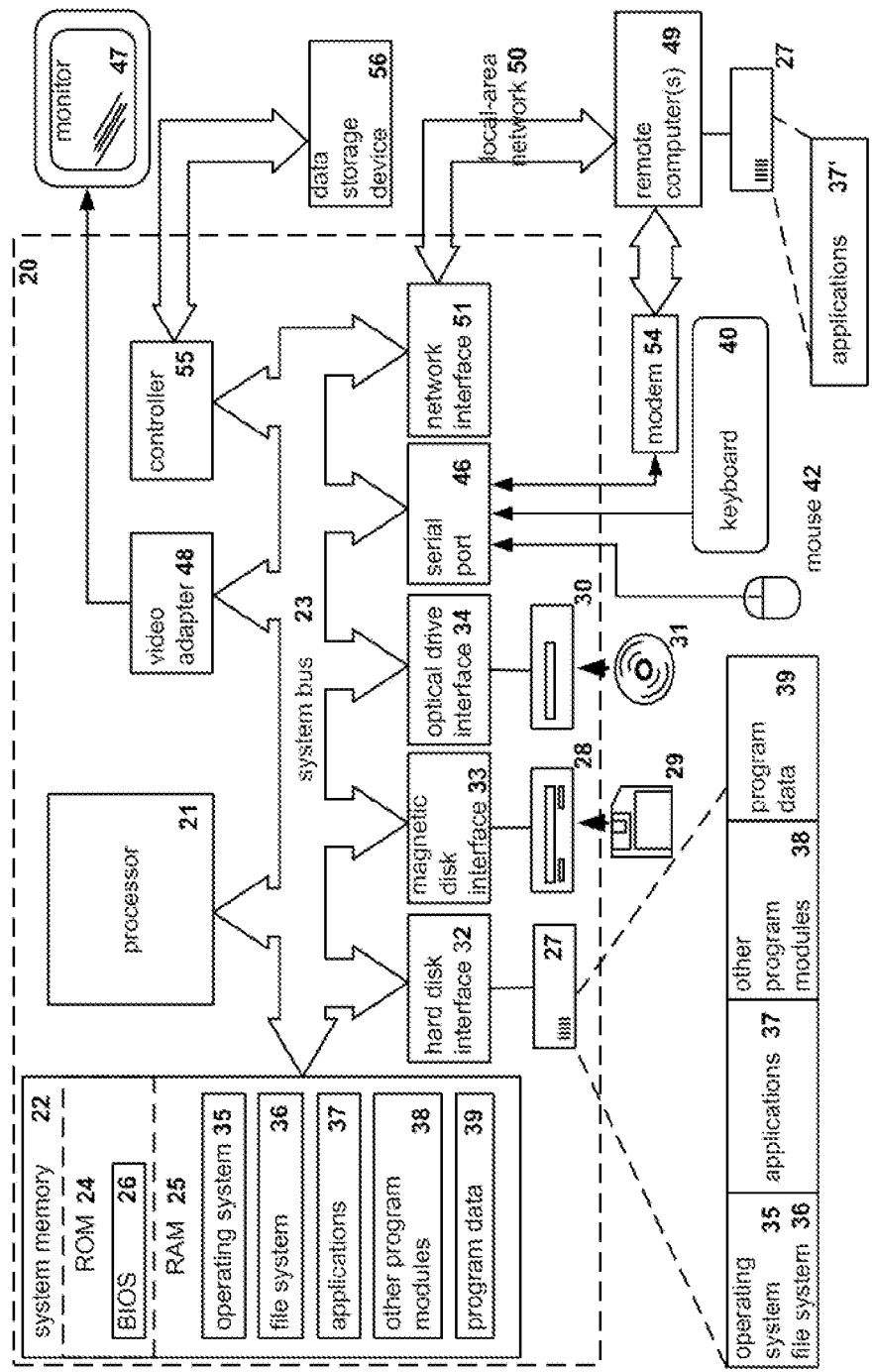
FIG. 7 illustrates a block diagram of an example of a general-purpose computer system on which the disclosed system and method can be implemented according to an exemplary aspect.

As described above, the file system switcher 310 and file system replacement module 316 can be implemented as software modules (or a combination of software and hardware modules) on a computing device, server, or the like. FIG. 7 illustrates a block diagram of an example of a general-purpose computer system on which the disclosed system and method can be implemented according to an exemplary aspect. It should be appreciated that the detailed general-purpose computer system can correspond to a computing device for file system switcher 310 described above. Moreover, the remote computer(s) 49, as described below, can correspond to any of the file systems 120A and 220B, for example, as well as the host operating system executing the processes/task (e.g., process 110A) as discussed above with respect to the exemplary system and method.

As shown in FIG. 7, the computer system 20 includes a central processing unit 21, a system memory 22 and a system bus 23 connecting the various system components, including the memory associated with the central processing unit 21. The central processing unit 21 can correspond to the CPU 312 and the system memory 22 can correspond to memory 314 for File system switcher 310, as an example. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for switching file systems based on an instruction from a user application, the method comprising:
receiving an instruction from a user application to replace a first file system by a second file system;
identifying and temporarily suspending all processes that are working with one or more files on the first file system;
obtaining information about all files that are used by a temporarily suspended process, the obtained information including at least information on corresponding memory mappings or file descriptors;
replacing resources of the first file system by matching resources of the second file system;
synchronizing attributes of the first and second file systems; and
resuming execution of suspended processes.

2. The method of claim 1, wherein the replacing of the resources of the first file system by matching resources of the second file system comprises:
obtaining or generating a device ID of the second file system and any number of mount IDs of the second file system;
replacing mount points of the first file system with respective mount IDs of the second file system;
opening files of the second file system that correspond to respective files of the first file system, wherein the correspondence is based on the files having matching paths, names and types of files;
replacing file descriptors for opened files of the first file system by file descriptors of corresponding files of the second file system; and
replacing memory mapping of the first file system by memory mapping of the second file system.

3. The method of claim 2, wherein the synchronization comprises:
synchronizing the file descriptor attributes of the first and second file systems.

4. The method of claim 1, wherein the first file system and the second file system are created by the user application.

5. The method of claim 1, wherein the identification of all of the processes that are working with the one or more files of the first file system comprises:
obtaining information about all running processes from an operating system; and
identifying, from among all of the running processes, which of the processes are working with files on the first file system during the execution of the process.

6. The method of claim 2, wherein the device IDs and mount IDs are determined from the file descriptor of the respective file system.

7. The method of claim 1, wherein the synchronized attributes include file offset, flags and locks.

8. The method of claim 1, further comprising:
notifying the user application that the switching of the file systems is completed.

9. A system for switching file systems based on an instruction from a user application, the system comprising:
a first file system and a second file system each configured to store a plurality of electronic files; and
at least one processor configured to:
receive an instruction from a user application to replace a first file system by a second file system;
identify and temporarily suspend all processes that are working with one or more files on the first file system;
obtain information about all files that are used by a temporarily suspended process, the obtained information including at least information on corresponding memory mappings or file descriptors;
replace resources of the first file system by matching resources of the second file system;
synchronize attributes of the first and second file systems; and
resume execution of suspended processes.

10. The system of claim 9, wherein the configuration for replacing of the resources of the first file system by matching resources of the second file system comprises configurations for:
obtaining or generating a device ID of the second file system and any number of mount IDs of the second file system;
replacing mount points of the first file system with respective mount IDs of the second file system;
opening files of the second file system that correspond to respective files of the first file system, wherein the correspondence is based on the files having matching paths, names and types of files;
replacing file descriptors for opened files of the first file system by file descriptors of corresponding files of the second file system; and
replacing memory mapping of the first file system by memory mapping of the second file system.

11. The system of claim 10, wherein the configuration for the synchronization comprises a configuration for:
synchronizing the file descriptor attributes of the first and second file systems.

12. The system of claim 9, wherein the first file system and the second file system are created by the user application.

13. The system of claim 9, wherein the configuration for the identification of all of the processes that are working with the one or more files of the first file system comprises configurations for:
obtaining information about all running processes from an operating system; and
identifying, from among all of the running processes, which of the processes are working with files on the first file system during the execution of the process.

14. The system of claim 10, wherein the device IDs and mount IDs are determined from the file descriptor of the respective file system.

15. The system of claim 9, wherein the synchronized attributes include file offset, flags and locks.

16. The system of claim 9, wherein the at least one processor is further configured to:
notify the user application that the switching of the file systems is completed.

17. A non-transitory computer readable medium storing thereon computer executable instructions for switching file systems based on an instruction from a user application, including instructions for:

receiving an instruction from a user application to replace a first file system by a second file system;

identifying and temporarily suspending all processes that are working with one or more files on the first file system;

obtaining information about all files that are used by a temporarily suspended process, the obtained information including at least information on corresponding memory mappings or file descriptors;

replacing resources of the first file system by matching resources of the second file system;

synchronizing attributes of the first and second file systems; and resuming execution of suspended processes.

18. The non-transitory computer readable medium of claim 17, wherein the instructions further comprise instructions for:

obtaining or generating a device ID of the second file system and any number of mount IDs of the second file system;

replacing mount points of the first file system with respective mount IDs of the second file system;

opening files of the second file system that correspond to respective files of the first file system, wherein the correspondence is based on the files having matching paths, names and types of files;

replacing file descriptors for opened files of the first file system by file descriptors of corresponding files of the second file system; and replacing memory mapping of the first file system by memory mapping of the second file system.

19. The non-transitory computer readable medium of claim 18, wherein the instructions further comprise instructions for:

synchronizing the file descriptor attributes of the first and second file systems.

20. The non-transitory computer readable medium of claim 17, wherein the first file system and the second file system are created by the user application.

* * * * *